Patented Jan. 5, 1937

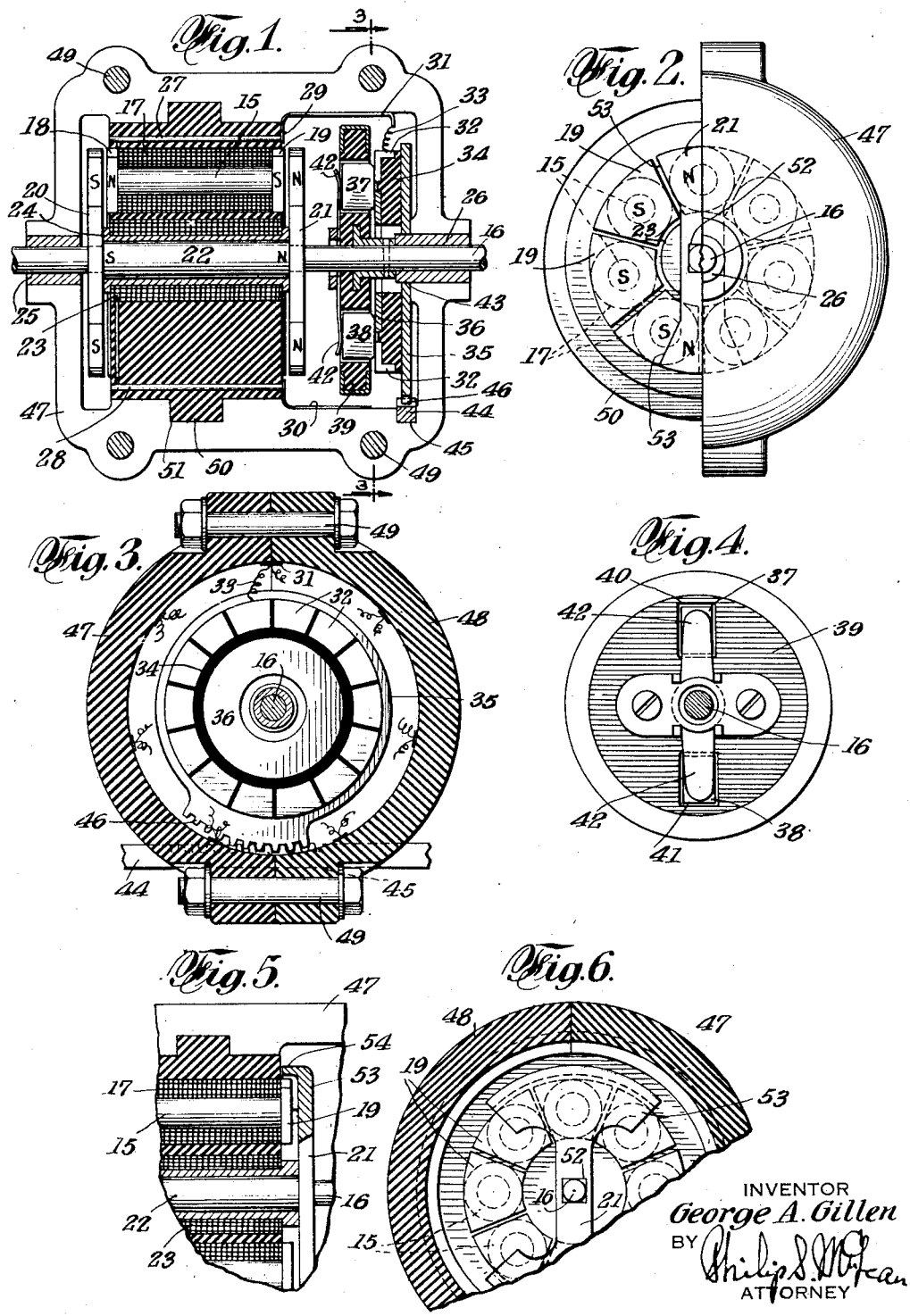

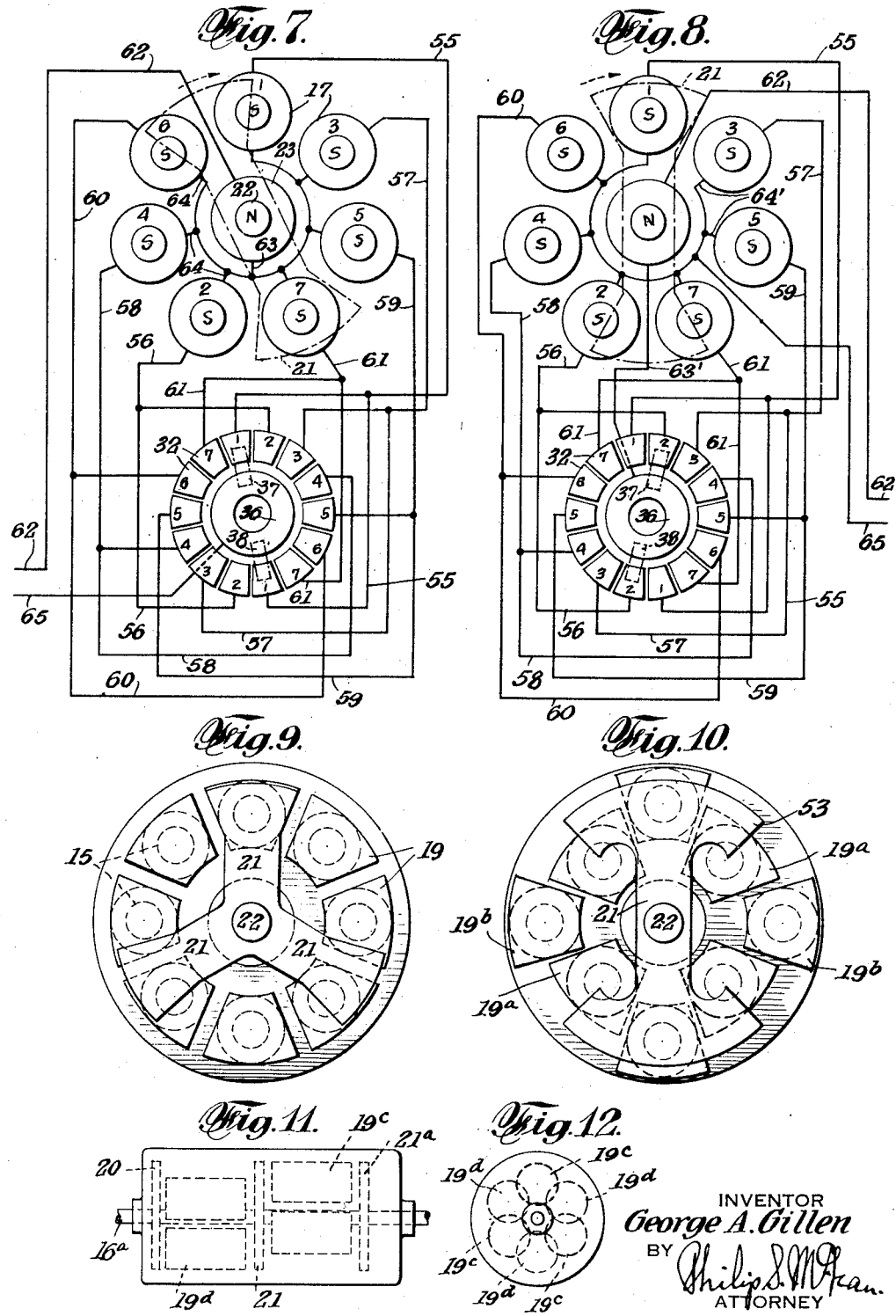

2,066,343

UNITED STATES PATENT OFFICE 2,066,343

ELECTROMAGNETIC MACHINE

George A. Gillen, Bronx, N. Y.

Application September 22, 1934, Serial No. 745,029

3 Claims. (Cl. 172—36)

This invention relates to electromagnetic machines generally, but in some respects more particularly to electric motors.

Objects of the invention are to provide an electromagnetic machine of simple, inexpensive design, consisting of few, simple parts, which can be readily and inexpensively assembled and which will be compact in form, powerful for its size and efficient in electrical and magnetic characteristics.

A further and special object of the invention is to so design the parts that they may for the most part, be all assembled and finally co-related by simply being molded in place in synthetic resin or other suitable insulating material.

Additional objects and the novel features of construction, combinations and relations of parts by which the objects of the invention are attained, will appear as the specification proceeds.

The drawings accompanying and forming part of the specification illustrate certain practical and at present preferred embodiments of the invention, but it will be understood that variations and modifications in structure may be made all within the true intent and broad scope of the invention.

Fig. 1 is a broken longitudinal sectional view of a motor embodying features of the invention.

Fig. 2 is an end elevation with half of the motor casing removed.

Fig. 3 is a broken cross sectional view as on line 3—3 of Fig. 1, showing in particular the relatively stationary though adjustable member of the commutator mechanism.

Fig. 4 is a detail of the rotatable brush member of the commutator, with the shaft on which it is mounted appearing in section.

Figs. 5 and 6 are broken longitudinal and cross-sectional details of a modified form of the invention.

Figs. 7 and 8 are wiring diagrams of the form of the invention illustrated in Fig. 1.

Figs. 9 and 10 are end views of two additional forms of the invention.

Fig. 11 is a broken longitudinal view illustrating the manner in which two or more of the motor or generator units may be built-up in tandem fashion.

Fig. 12 is an end elevation illustrating the feature of angularly offsetting the coils of the different units.

A special feature of the present invention is that the field magnets are straight bar magnets having poles at opposite ends in cooperative relation with armature elements journalled on a center common to all the magnets.

In Figs. 1 and 2, the cores of the bar magnets are indicated at 15, parallel with each other and grouped in circular series about the common axis occupied by shaft 16.

These magnet cores carry suitable windings 17 and have at their opposite ends poles 18, 19, opposed to armature elements 20, 21, on the shaft. In the particular forms of the invention shown, the armature elements are polarized by making the shaft or the enlarged portion 22, of the same between the armature elements of magnetic material and by surrounding it with a magnetizing coil 23.

The shaft may be journalled in the spool or hollow center 24, of the central coil 23, or in bearings 25, 26, carried by the motor casing, or both sets of such bearings may be utilized.

The central armature magnet and the surrounding group of field magnets are separated and properly spaced in the present disclosure by a surrounding body of insulating material 27, such as a suitable resinoid, molded about the same. This material has the necessary strength and permanency to support and maintain the magnets in the desired fixed relation with the poles at the ends of the field coils exposed in substantially parallel planes at the opposite sides of the molded base. The completed molded unit is thus in the nature of a disc with only the pole faces exposed at opposite sides of the same. The molding of this unit is a relatively simple matter as the poles 18, 19, which may be of segmental design as in Fig. 2, may be readily located in the mold and held in place during the filling and mold closing operations.

The terminal connections for the armature and field coils may be connected with the coils and molded in the base, substantially as indicated at 28, 29, in Fig. 1, extension strips 30, 31, being brought out from these molding terminals.

The commutator or switch mechanism for the coils is shown in Figs. 1 to 4, as consisting of contact segments 32, connected by wiring 33, with coil conductors 31, these segments being set flush in insulation 34, carried by a supporting plate 35, in circular arrangement outside a contact ring 36, in position for engagement by connecting brushes 37, 38, on an insulating support 39, fast on the shaft. This insulating support is shown constructed as a complete circular element serving in the nature of a fly wheel, the brushes slidingly fitting in the guide slots 40, 41, and pressed by a spring or springs 42, into proper contacting engagement with the commutator disc.

The commutator disc is shown in Figs. 1 and 3 as rotatably supported at its center at 43, on the bearing bushing 26, and as angularly adjustable in this relation by means of a rack rod 44, slidable in a guideway 45, and engaging pinion teeth 46, on the back plate of the commutator member. By means of this adjustment, the coils may be energized to vary the speed, stop, or reverse the motor, as more particularly described in conjunction with the wiring diagrams.

The casing of the motor is illustrated in Figs. 1, 2 and 3 as consisting of two substantially semi-circular casing sections 47, 48, secured together over the field, armature and commutator structure by bolts or screws 49. To definitely locate the field unit in this two part casing, the field disc is shown as molded with an annular rim 50, fitting in a corresponding annular groove 51, molded inside the casing.

The armature elements are shown in Figs. 1 and 2, as being substantially straight bars fixed on squared shoulders 52, of the shaft, providing armature arms projecting in opposite directions from the shaft and having flared or widened tips 53, to gain a certain extent of lap or lead over the field poles.

The extent and form of the magnetic relation between the armature and field poles may vary. Thus as indicated in Figs. 5 and 6, the armature may have an overlapping relation with respect to the field poles as by having an angularly projecting flange 54, extending about the outer edges of the poles. This relation might be reversed with the poles extending out over the edges of the armature. In the views under consideration, the armature tips 53 are shown as extended, so as to substantially comprehend two complete pole tips in area.

In the case of a simple magnetic attraction motor of seven poles and fourteen commutator segments, the parts may be wired as indicated in Fig. 7, that is, with what may be considered the No. 1 field magnet connected by wiring 55, with the No. 1 commutator segments, the No. 2 field coil in the opposite portion of the field structure by wiring 56, wth the No. 2 commutator segments, the No. 3 field coil by wiring 57, with No. 3 segments, the No. 4 field coil by wiring 58, with No. 4 segments, the No. 5 field coil by wiring 59 with No. 5 segments, the No. 6 field coil by wiring 60, with the No. 6 segments and the No. 7 coil by wiring 61, with the No. 7 segments. This uneven number of field magnets with the two armed armatures shown and the energizing of the coils successively at opposite sides of the rotational axis provides substantially continuous magnetic traction on the armature shaft. The opposite ends of the magnets simultaneously exert their force on the armatures at opposite ends of the shaft, applying a balanced effort on the shaft, the shaft being thereby to some extent "floated" by the magnets disposed in between the armatures thereon. Short, powerful and electrically and magnetically efficient magnets may be used and located as they are, between the armatures, they do not add to the overall diameter of the structure.

By advancing or retarding the commutator segments, it will be evident that the magnets may be brought into action sooner or later in the cycle of operations. Thus by shifting the commutator body through the rack and pinion arrangement shown in a backward or retarding direction, the poles may be energized in a way to slow down or actually exert a braking force on the armature capable of slowing down and finally actually holding the armature in a state of rest. A continuance of this adjustment may be utilized to start the armature shaft rotating in the opposite direction. Consequently, without changing any electrical connections, the motor speed may be varied and the motor be stopped and then started in the opposite direction.

The central coil 23 may be connected to polarize the armature always in the same sign or, if the field magnets be so connected, in alternation with the field magnets. In Figs. 1 and 7, the field magnets are indicated as constantly poled in the same direction, that is, with all N poles at one end of the field and with all S poles at the opposite end of the field and consequently the central magnet is connected to polarize the armature arms S at one end and N at the opposite end. As shown in Fig. 7, this is accomplished by connecting one side 62 of the service system directly with one end of the center coil and the opposite end 63, of the center coil connected by branches 64, with the several field coils. Most of these connections may be embedded in the molded field insulation and to avoid confusion, it is not attempted to illustrate all these in the structural views. The opposite side 65, of the line is in this case connected with the slip ring 36.

As a possible variation of the circuit just described, the lead 63 from the center coil may be carried direct to the slip ring 36, substantially as indicated at 63' in Fig. 8, and the other side of the line 65, be connected in with the several branches 64' going to the field coils.

To make the motor self starting and assure continuous torque, an uneven or offset relationship of magnet poles and armature arms is usually provided. In the forms previously described, there are seven magnet poles evenly spaced about the armature center and a straight two armed armature is provided at each end of the shaft. Consequently there will be an offset relation in all positions of the armature and with a proper setting of the commutator, the motor will start in either direction from all positions of rest.

In Fig. 9, the relationship is reversed by having an even number of field magnets at 19, eight in this instance, and an uneven number of armature arms, three equidistantly spaced armature arms being indicated at 21.

In the form of the invention illustrated in Fig. 10, the offset effect is produced by staggering the field coils, with an inner circle of field magnets 19a and an outer alternately disposed set of field coils at 19b, partly between the first set of magnets. This construction also enables a certain consolidation, permitting a greater number of magnets within the same overall diameter.

The machine may be operated as a repulsion or combination of repulsion and attraction motor and on either direct or alternating current, the parts being laminated and otherwise designed as required by standard engineering practice.

The straight field magnets may be inexpensively produced and can be made the length which is most efficient for powerful field magnet service. Both ends of these magnets are completely coupled by the armature structure and with gaps only wide enough for actual clearance, so that there is practically no "stray" magnetic losses and magnetic reluctance can be kept at a minimum.

The possible small diameter of the motor is of special advantage where motive power must be provided in a confined or limited space. Where additional power is required, this may be provided by building up a number of the motor units, side-by-side on a common shaft 16a as indicated in Fig. 11. In such an instance, the armature element 21 which comes between the poles of adjoining units may be common to both those units, substantially as shown and the end armature elements 20 and 21a, cooperating with the outer sets of pole pieces.

Fig. 12 shows how in a tandem arrangement, such as indicated in Fig. 11, the magnets of one unit as indicated at 19c may be offset angularly with respect to magnets 19d of the other unit.

If desired, the motor may be of oscillatory instead of the rotary type. While the invention has been described particularly as a motor, it will be apparent to those skilled in the art that it applies to generating as well as to power developing equipment. Various changes may be made. Thus the central polarizing coil 23 about the armature shaft may be omitted and the armature elements 20, 21, be simply in the nature of magnetic "keepers", in the case of motor structures, magnetically attracted as they come within range of the field magnets. The short substantially parallel magnet cores with poles exposed at opposite faces of the disc-like molded field unit provides a rigid, strong structure, which may be easily faced off at opposite ends if that be considered necessary or desirable. The brush wheel operates with a fly wheel effect to assure smooth quiet operation.

The terms employed herein such as "field" and "armature" are used in a descriptive rather than a limiting sense, except possibly for limitations as may be required by the state of the prior art.

What is claimed is:

1. An electromagnetic machine, comprising a molded insulating base having field coils embedded therein with poles at opposite sides of the molded base in substantially parallel planes, a shaft extending through said base and having projecting armature elements at the opposite faces of the base in magnetically coupled relation with said poles, a sectional molded case separably attached about said molded base, a commutator mounted in the case and having segments connected with said embedded field coils in the base and a brush on the shaft in cooperative relation with said segments.

2. An electromagnetic machine, comprising a one piece molded base of insulating material, magnet coils embedded in said molded base and having poles at opposite ends of the same exposed in substantially parallel planes at opposite sides of the base, armature elements cooperating with said poles and a two part molded case engaged about said one piece molded magnet base.

3. An electromagnetic machine comprising a disc-like base of insulating material, field magnets carried by said base having poles at opposite ends disposed at the opposite faces of said disc-like base, armature elements rotatably supported to traverse the opposite faces of said base in magnetically coupled relation to the exposed poles, a sectional case separably attached about said disc-like base, said base and surrounding sectional case having companion rib and groove elements definitely locating the parts of the sectional case about said disc-like base.

GEORGE A. GILLEN.